(12) United States Patent
Bach-Esteve Burch

(10) Patent No.: US 11,614,142 B2
(45) Date of Patent: Mar. 28, 2023

(54) DAMPING MEANS OF AN ELECTRIC MOTOR OF AN AIRFLOW GENERATING APPARATUS AND SAID APPARATUS COMPRISING THE DAMPING MEANS

(71) Applicant: SOLER & PALAU RESEARCH, S.L., Parets del Valles (ES)

(72) Inventor: Albert Bach-Esteve Burch, Parets Del Valles (ES)

(73) Assignee: SOLER & PALAU RESEARCH, S.L., Parets del Valles (ES)

( * ) Notice: Subject to any disclaimer, the term of this patent is extended or adjusted under 35 U.S.C. 154(b) by 359 days.

(21) Appl. No.: 16/884,383

(22) Filed: May 27, 2020

(65) Prior Publication Data
US 2020/0378468 A1 Dec. 3, 2020

(30) Foreign Application Priority Data
May 31, 2019 (EP) .................................. 19382443

(51) Int. Cl.
| | |
|---|---|
| *F16F 15/12* | (2006.01) |
| *H02K 5/24* | (2006.01) |
| *H02K 5/22* | (2006.01) |
| *F04B 39/00* | (2006.01) |
| *F04D 29/66* | (2006.01) |
| *F16F 15/02* | (2006.01) |
| *H02K 9/06* | (2006.01) |

(52) U.S. Cl.
CPC .......... *F16F 15/12* (2013.01); *F04B 39/0044* (2013.01); *F04D 29/668* (2013.01); *F16F 15/02* (2013.01); *F16F 15/021* (2013.01); *H02K 5/22* (2013.01); *H02K 5/24* (2013.01); *H02K 9/06* (2013.01)

(58) Field of Classification Search
CPC .............................. F16F 15/12; F04B 39/0044
See application file for complete search history.

(56) References Cited

U.S. PATENT DOCUMENTS 3,746,894 A * 7/1973 Dochterman ............ H02K 5/24
417/363

FOREIGN PATENT DOCUMENTS

| | | | |
|---|---|---|---|
| DE | 19813984 A1 * | 9/1999 | ........... F04D 29/668 |
| DE | 19936178 A1 | 2/2001 | |
| DE | 102015001447 A1 | 8/2016 | |

(Continued)

OTHER PUBLICATIONS

European Search Report for Corresponding EP Application No. 19382443.0., 2 pages, dated Oct. 4, 2019.

*Primary Examiner* — Melody M Burch
(74) *Attorney, Agent, or Firm* — Lucas & Mercanti, LLP

(57) ABSTRACT

The present invention relates to damping devices of an electric motor of an airflow generating apparatus and the apparatus having these devices, the devices having a first part, a second part, and a damping element, the damping element being arranged such that it determines an attachment between the first part and the second part, and having at least one central wall having two longitudinal ends. At least one of the two longitudinal ends of the at least one central wall is defined to form an angle with respect to the first part such that an imaginary transverse surface containing the at least one of the two longitudinal ends can be defined parallel to an imaginary joining line (A) between a center of masses of the at least one central wall and a center of gravity of the electric motor.

7 Claims, 4 Drawing Sheets

(56) References Cited

FOREIGN PATENT DOCUMENTS

| EP | 0926803 | A2 | | 6/1999 | | |
|----|---------|----|----|--------|----|----|
| EP | 1619410 | A1 | * | 1/2006 | ............... | F16D 3/12 |
| FR | 2408938 | A  | * | 7/1979 | ............... | H02K 5/24 |
| KR | 101380962 | B1 | * | 4/2014 | | |

* cited by examiner

DAMPING MEANS OF AN ELECTRIC MOTOR OF AN AIRFLOW GENERATING APPARATUS AND SAID APPARATUS COMPRISING THE DAMPING MEANS

CROSS REFERENCE TO RELATED APPLICATION

This application claims the benefit of priority of European Patent Application No. 19382443.0, filed on May 31, 2019, which is incorporated herein by reference.

TECHNICAL FIELD

The present invention relates to the industry dedicated to airflow generating apparatus, such as air extractors and fans, and more specifically to the industry dedicated to controlling the temperature of electric motors in said apparatus to prevent noises generated by vibrations during the operation thereof.

BACKGROUND OF THE INVENTION

Electric motors for airflow generating apparatus, such as air extractors and fans, are widely known today, said electric motors being formed mainly by two parts, i.e., a rotor and a stator.

Both the stator and the rotor are discontinuous means, given that they have singular points, which can be referred to as polarities. Therefore, when the rotor rotates while the stator remains static, pulsations are produced due to the polarities of the stator clashing in a discontinuous manner with the polarities of the rotor. These pulsations correspond with isolated and repeated rotational impulses transmitted to the blades or vanes fixed with respect to the rotor. According to this, the electric motor provides a motor torque according to said pulsations, i.e., a discontinuous torque as it has peaks and valleys.

This operation of the electric motors leads to a tangential vibration of an outer shell of the electric motors themselves. This vibration is the most unwanted in electric motors and is intensified in electronic pole switching (brushless) electric motors the poles of which in the rotor are formed by magnets. Said tangential vibration is the source of noise and, when transmitted to adjacent elements mechanically attached to the electric motor, in turn causes these elements to vibrate, thereby amplifying the noise generated.

Furthermore, electric motors are arranged fixed or fastened to a structural element of the apparatus at a rear longitudinal end, i.e., opposite the end where the corresponding blades are located. According to this cantilever arrangement of the electric motors, they tend to bend due to the action of gravity such that the blades contact the side walls radially and externally surrounding them. This contact generates noise, in addition to damage to the blades and/or said side walls. In view of these problems, the solution that is conventionally used consists of utilizing, as an intermediate element between the electric motor and the structural element for fixing the motor, an element made of an elastically deformable material for absorbing tangential vibrations and minimizing the bending or drop of the front longitudinal end where the blades are located. Depending on the characteristics typical of the corresponding electric motor, such as weight, longitudinal extension, and motor torque to be generated, for example, the element is provided according to a larger or smaller thickness.

However, this solution is not efficient in practice because the electric motor must be radially held with considerable strength or rigidity, while at the same time having certain capacity to move tangentially, i.e., certain capacity to rotate with respect to an imaginary longitudinal central axis thereof, which cannot be optimally afforded by means of the element as an intermediate element between the electric motor and the structural element for fixing the motor According to said solution that is conventionally used, the electric motor is held either insufficiently so as to prevent the blades form contacting the side walls of the compartment of the motor itself or excessively such that the tangential or rotational movement is transmitted to the adjacent elements mechanically attached to the electric motor. Unwanted noise is generated in either of the two cases or in both cases.

In view of the described drawback or limitation of the solutions existing today, a solution which allows absorbing tangential vibrations and preventing the bending or drop of the front longitudinal end where the blades are located.

OBJECT OF THE INVENTION

In order to achieve this objective and solve the technical problems described up until now, in addition to providing additional advantages which can be derived hereinafter, the present invention provides damping means of an electric motor of an airflow generating apparatus with a longitudinal measurement according to an imaginary central axis.

Likewise, the present invention provides an airflow generating apparatus with a longitudinal measurement according to an imaginary central axis comprising the damping means.

According to this, the present apparatus additionally comprises an electric motor. This electric motor in turn comprises a stator and a rotor for generating a rotational movement, and at least one blade arranged for suctioning and driving air.

The damping means comprise a first part which is arranged fixed to the electric motor; a second part which is arranged fixed to the apparatus; and a damping element which is elastically deformable and has a longitudinal extension.

According to this, the first part and the second part are separated from one another, the damping element being arranged such that it determines an attachment between the first part and the second part.

The damping means comprise a first body, in which the first part is located and a second body, in which the second part is located.

Preferably, a first imaginary plane containing the first part and a second imaginary plane containing the second part can be defined, the first imaginary plane and the second imaginary plane being parallel to one another.

Preferably, the first imaginary plane and/or the second imaginary plane is perpendicular to the imaginary central axis.

Preferably, there are at least two damping elements, the damping elements being angularly distributed with respect to the imaginary central axis.

The damping element comprises at least one central wall, such that according to the longitudinal extension the central wall has two longitudinal ends and two elongated sides. Additionally or alternatively, the at least one central wall has an elongated laminar configuration.

When there are two central walls, these walls are arranged in a parallel or converging manner with respect to one another.

At least one of the two longitudinal ends of the at least one central wall is defined to form an angle with respect to the first part such that an imaginary transverse surface containing the at least one of the two longitudinal ends can be defined parallel to an imaginary joining line between a center of masses of the at least one central wall and a center of gravity of the electric motor.

Preferably, each of the two longitudinal ends of the at least one central wall is defined to form the angle with respect to the first part such that the imaginary transverse surfaces containing the two longitudinal ends can be defined parallel to the imaginary joining line.

The damping element preferably comprises a first wall fixed to the first part, the at least one central wall being attached along the first wall according to one of the two elongated sides. Additionally or alternatively, the damping element preferably comprises a second wall fixed to the second part, the at least one central wall being attached along the second wall according to the other one of the two elongated sides.

The damping element is configured such that an imaginary longitudinal line can be defined parallel to the imaginary central axis and through the at least one central wall from one of the two elongated sides to the other one of the two elongated sides.

DETAILED DESCRIPTION OF THE INVENTION

Figure 1:
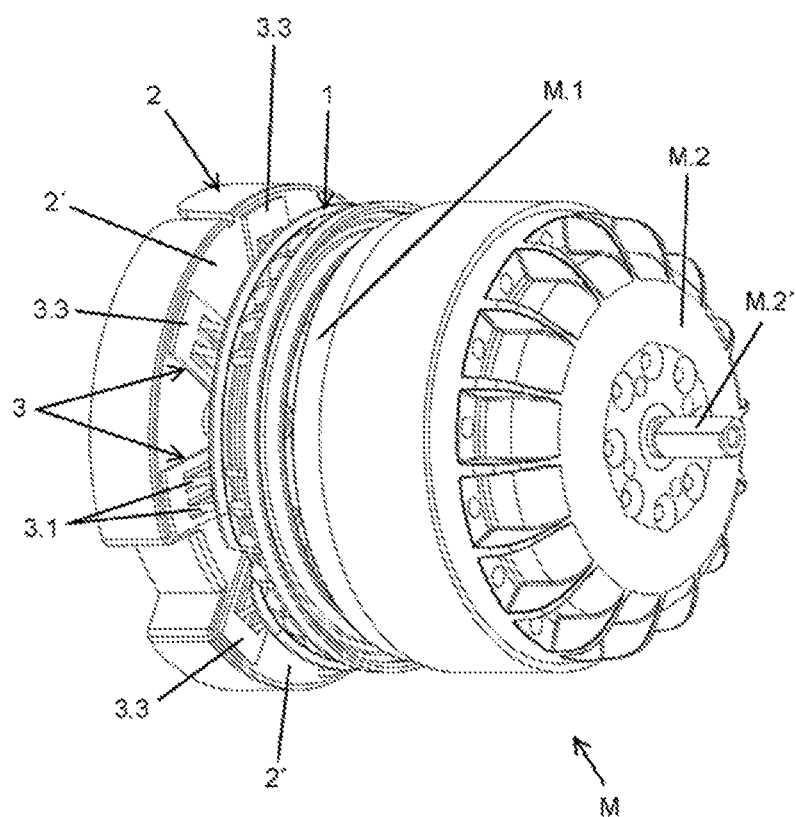
FIG. 1 shows a schematic perspective view of damping means of an electric motor of an airflow generating apparatus objects of the invention.
Figure 2:
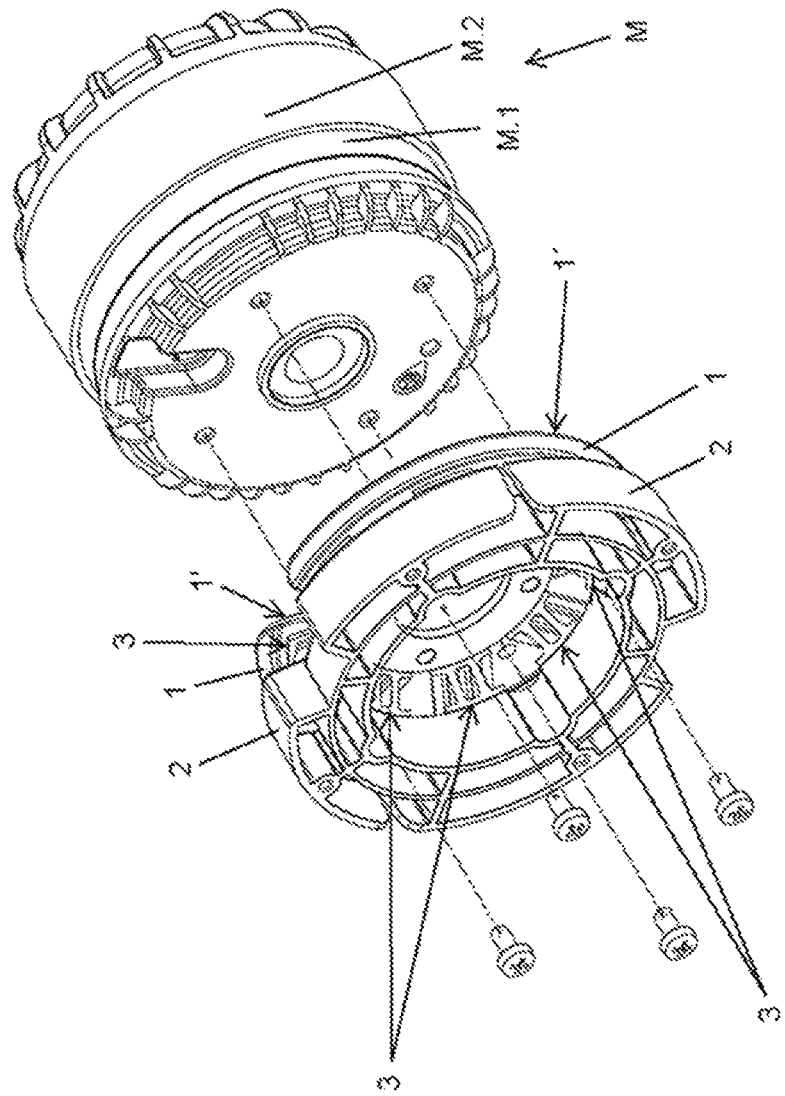
FIG. 2 shows an exploded schematic view of the damping means and the electric motor.

The present invention relates to damping means of an electric motor (M) of an airflow generating apparatus, as well as to the airflow generating apparatus comprising said damping means, in addition to the electric motor (M). Preferably, the airflow generating apparatus is selected from an air extractor and a fan.

The electric motor (M) comprises a stator (M.1) and a rotor (M.2) for generating a rotational movement, and at least one blade (not shown in the drawings) arranged for generating the airflow, preferably acting either as an air extractor or as a fan. According to an optional example, the corresponding blades are mechanically attached directly to the rotor (M.2). According to another optional example, the electric motor (M) comprises an output shaft (M.2') mechanically attached to the rotor (M.2) such that the output shaft (M.2') rotates together with the rotor (M.2), with the corresponding blades being mechanically attached directly to said output shaft (M.2').

The damping means comprise a first part (1') and a second part (2') for the arrangement of the electric motor (M) inside the apparatus, said apparatus having a longitudinal measurement or length according to an imaginary central axis (X) thereof. This imaginary central axis (X) can be seen in FIG. 4.

According to a preferred option, the damping means comprise a first body (1) in which the first part (1') is located, the first body (1) being independent with respect to the electric motor (M). According to this option, the first body (1) preferably has a substantially laminar or planar shape, and a substantially disc shape.

According to another preferred option, the first part (1') corresponds directly with a rear longitudinal end of the electric motor (M), this end being arranged opposite a front longitudinal end where the at least one blade is located.

The first part (1') is configured for the fixed arrangement of the electric motor (M) therein. According to this, the damping means comprise anchoring points in correspondence with the first part (1') and/or with the first body (1) for said fixed arrangement of the electric motor (M) through the rear longitudinal end thereof. This fixed arrangement is preferably by means of threaded attachments such as the attachments afforded by means of screws, for example.

The first part (1') is preferably configured such that a first imaginary plane containing the first part (1') can be defined. Likewise, a first imaginary central axis in the first part (1') can be defined such that it is perpendicular to the mentioned first imaginary plane, i.e., to the first part (1') or the first body (1).

The damping means comprise a second body (2) in which the second part (2') is located. The first body (1) and the second body (2) are independent of one another. Furthermore, the first body (1) and the second body (2) are aligned with and separated from one another in the axial direction according to the direction of the imaginary central axis (X). The first part (1') and the second part (2') are therefore separated from one another. The second body (2) preferably has a substantially laminar or planar shape, and a substantially disc shape.

The second part (2') is configured for the fixed arrangement of the damping means with respect to the airflow generating apparatus. This fixed arrangement is preferably established by means of threaded attachments, such as the attachments afforded by means of screws, for example. For this fixed arrangement, the damping means comprise fixing points (not indicated in the drawings) in correspondence with the second part (2') and/or with the second body (2).

The second part (2') is preferably configured such that a second imaginary plane containing the second part (2') can be defined. Likewise, a second imaginary central axis in the second part (2') can be defined such that it is perpendicular to the mentioned second imaginary plane, i.e., to the second part (2') or the second body (2).

Figure 4:
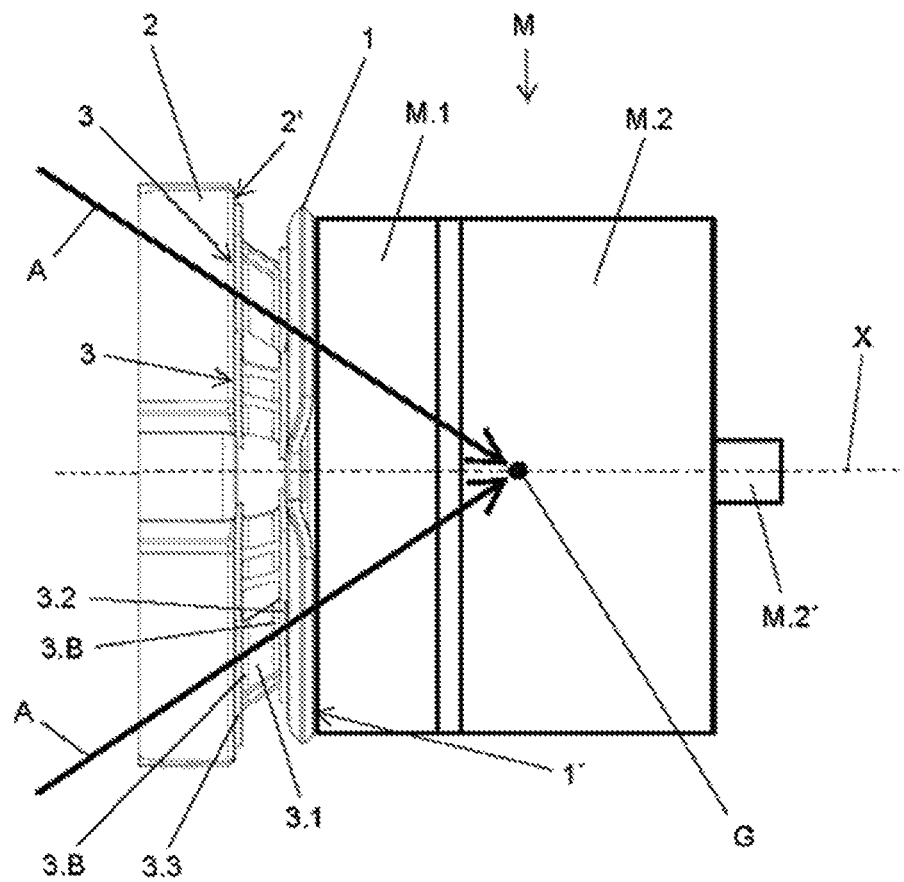
FIG. 4 shows a schematic sectional side view of the damping means with the electric motor arranged fixed therein.

Preferably, the second imaginary central axis of the second part (2') coincides with the first imaginary central axis of the first part (1'). Preferably, said first imaginary central axis is parallel to or coincides with the imaginary central axis (X). Additionally or alternatively, said second imaginary central axis coincides with the imaginary central axis (X). FIG. 4 depicts the imaginary central axis (X) coinciding both with the first imaginary central axis and with the second imaginary central axis.

The damping means comprise a damping element (3), and preferably a plurality of damping elements (3). According to this, there are preferably between 2 and 36, more preferably between 3 and 24, even more preferably between 4 and 18, and yet more preferably between 8 and 16 damping elements (3).

The larger the number of damping elements (3), the greater the resistance offered against the tendency of the first part (1'), and therefore of the first body (1), to move radially or perpendicularly with respect to the imaginary central axis (X), the first imaginary central axis, and/or the second imaginary central axis, will be. This tendency may be generated by the actual weight of the first body (1). Additionally, said tendency may be generated by the electric motor (M), including the blades, either as a result of the weight and/or arrangement that can be attributed thereto, or as a result of all these determining factors.

The damping element (3) is elastically deformable. According to this, the damping element (3) is made of an elastomer material, such as gum or rubber, for example. Likewise, the damping element (3) has a longitudinal extension.

When there are two or more damping elements (3), these damping elements (3) are preferably arranged angularly distributed with respect to the imaginary central axis (X). This arrangement can be seen in FIG. 1, for example.

Each of the damping elements (3) is arranged such that it determines an attachment between the first part (1') and the second part (2'). More specifically and according to what has been described, each of the damping elements (3) is arranged attaching the first body (1) and the second body (2) to one another.

The damping element (3) comprises one central wall (3.1), and preferably two, each of these central walls (3.1) preferably having an elongated laminar configuration. Each of the central walls (3.1) is arranged to prevent or block the tendencies of the first part (1'), and therefore of the first body (1), to move radially or perpendicularly with respect to the imaginary central axis (X), the first imaginary central axis, and/or the second imaginary central axis.

Figure 3:
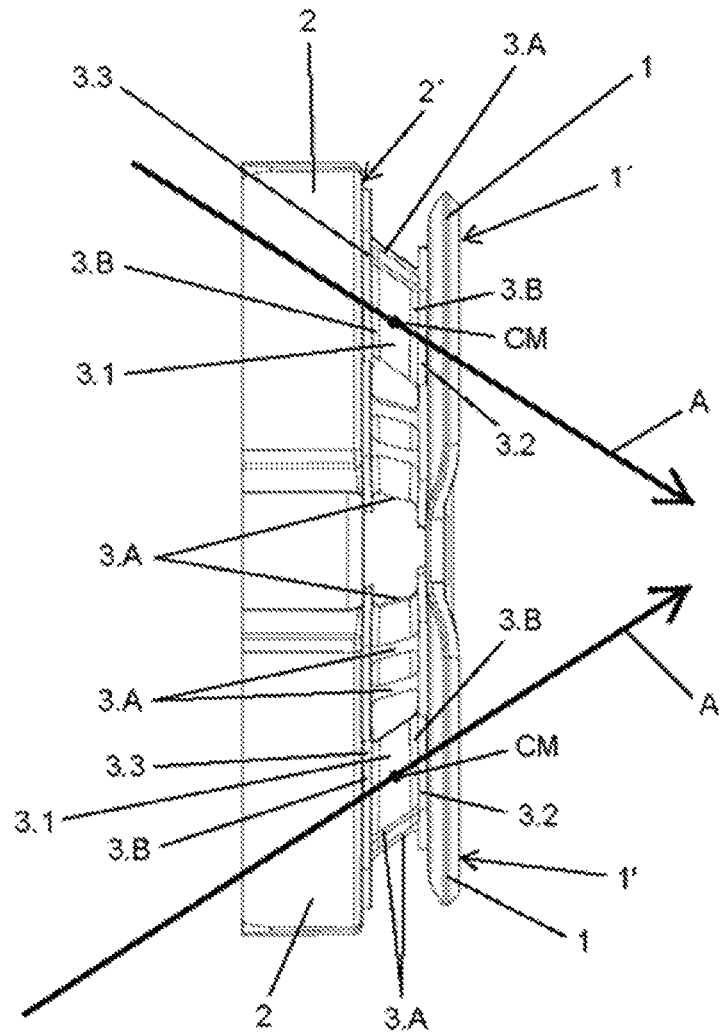
FIG. 3 shows a schematic side view of the damping means.

Each of the central walls (3.1) is configured such that, according to the longitudinal extension of the damping element (3), two longitudinal ends (3.A) and two elongated sides (3.B) can be defined in the central wall (3.1) itself. According to this, the two elongated sides (3.B) are attaching the two longitudinal ends (3.A) to one another. Furthermore, the elongated sides (3.B) have an extension or a longitudinal measurement preferably greater than the longitudinal ends (3.A). See FIG. 3, for example.

The damping elements (3) suffer a tendency to elastically deform according to the tendency of the first part (1'), and therefore of the first body (1), to move radially or perpendicularly with respect to the imaginary central axis (X), the first imaginary central axis, and/or the second imaginary central axis.

This radial movement tendency is counteracted by the central wall (3.1), said wall (3.1) being subjected to traction or compression from or through the elongated sides (3.B) depending on a relative spatial position with respect to an imaginary horizontal plane containing a center of gravity (G) of the electric motor (M), or of an assembly formed by the first body (1) and the electric motor (M). The imaginary horizontal plane can be defined perpendicular to the direction of gravity.

Each of the damping elements (3) additionally comprises a first wall (3.2) arranged fixed to the first part (1'), and more specifically to the first body (1). The first wall (3.2) has a thickness preferably between 0.1 mm and 5 mm, more preferably between 0.5 mm and 3 mm, and even more preferably between 1 mm and 2.5 mm.

When the damping element (3) comprises one central wall (3.1), said central wall (3.1) is attached according to one of the elongated sides (3.B) to the first wall (3.2) along said first wall (3.2) according to a longitudinal central part having a width of said first wall (3.2). By means of the first wall (3.2), a larger fixing surface is thereby provided between the damping element (3) and the first body (1), or between the damping element (3) and the first part (1'), than by means of the central wall (3.1).

When the damping element (3) comprises two central walls (3.1), said central walls (3.1) are attached according to the elongated sides (3.B) corresponding to the first wall (3.2) along said first wall (3.2), one of the central walls (3.1) preferably being parallel to the other one of the central walls (3.1). Alternatively, this may take place with the central walls (3.1) arranged in a converging manner with respect to one another, being extended towards the first imaginary central axis and/or the second imaginary central axis. According to both possibilities, a separation between the two central walls (3.1) is located according to the longitudinal central part of the width of said first wall (3.2).

Likewise, according to the thickness of the first wall (3.2), said wall (3.2) provides greater resistance against the tendency of the first body (1'), and therefore of the first body (1), to move radially by both traction and compression according to contact faces with the corresponding central wall (3.1) and with the first part (1'), and therefore with the first body (1). This arrangement or configuration can be seen in both FIG. 3 and FIG. 4.

Each of the damping elements (3) additionally comprises a second wall (3.3) arranged fixed to the second body (2), and more specifically to the second part (2'). The second wall (3.3) has another thickness preferably between 0.1 mm and 5 mm, more preferably between 0.5 mm and 3 mm, and even more preferably between 1 mm and 2.5 mm. Preferably, the thickness of the first wall (3.2) and the other thickness of the second wall (3.3) are the same.

When the damping element (3) comprises one central wall (3.1), said central wall (3.1) is attached according to the other one of the elongated sides (3.B) to the second wall (3.3) along said second wall (3.3) according to a longitudinal central portion having a width of said second wall (3.3). By means of the second wall (3.3), a larger fixing surface is thereby provided between the damping element (3) and the second body (2), or between the damping element (3) and the second part (2'), than by means of the central wall (3.1).

When the damping element (3) comprises two central walls (3.1), said central walls (3.1) are attached according to the elongated sides (3.B) corresponding to the second wall (3.3) along said second wall (3.3), one of the central walls (3.1) preferably being parallel to the other one of the central walls (3.1). Alternatively, this may take place with the central walls (3.1) arranged in a converging manner with respect to one another, being extended towards the first imaginary central axis and/or the second imaginary central axis. According to both possibilities, the separation between the two central walls (3.1) is located according to the longitudinal central portion of the width of said second wall (3.3).

Likewise, according to the thickness of the second wall (3.3), said wall (3.3) provides greater resistance against the tendency of the first body (1'), and therefore of the first body (1), to move radially by both traction and compression according to contact faces with the corresponding central wall (3.1) and with the first part (1'), and therefore with the first body (1). This arrangement or configuration can be seen in both FIG. 3 and FIG. 4.

According to tangential or rotational movements of the first part (1'), and therefore of the first body (1), with respect to the imaginary central axis (X) and/or the first imaginary central axis, the first wall (3.2) and/or the second wall (3.3) partially absorb said tangential movement tendency by both traction and compression according to the mentioned contact faces of the first wall (3.2) and/or the second wall (3.3). In turn, each of the central bodies (3.1) also partially absorbs said tangential movement tendency by traction according to one of the faces thereof and simultaneously by compression according to the other one of the faces thereof.

According to this, the damping means provide the first part (1'), and therefore the first body (1), with the capacity to move tangentially with respect to the imaginary central axis (X), the first imaginary central axis, and/or the second imaginary central axis, preventing excessive rigidity which transmits tangential vibrations to the rest of the apparatus in which said damping means is arranged, while at the same time absorbing or damping same in a smooth and quiet manner.

Each of the damping elements (3) is arranged such that an imaginary radial line can be defined, this imaginary radial line being developed perpendicular to the imaginary central axis (X), the first imaginary central axis, and/or the second imaginary central axis, in addition to through the central wall (3.1) from one of the two longitudinal ends (3.A) to the other one of the two longitudinal ends (3.A). A better way to counteract the tendency of the first part (1'), and therefore of the first body (1), to move radially is therefore provided.

For improved prevention or blocking of the first part (1'), and therefore of the first body (1), from the tendencies to move radially or perpendicularly with respect to the imaginary central axis (X), the first imaginary central axis, and/or the second imaginary central axis, each of the damping elements (3) is arranged to coincide with an imaginary transverse surface that can be defined perpendicular to the imaginary central axis (X), the first imaginary central axis, and/or the second imaginary central axis. Said imaginary transverse surface can preferably be defined such that it only goes through the central wall (3.1), the first wall (3.2), or the second wall (3.3) of each of the damping element (3).

For further improved prevention or blocking, the two longitudinal ends (3.A) of one of the central walls (3.1) of the corresponding damping element (3) are defined to form an angle with respect to the first part (1'), and preferably also with respect to the second part (2'), such that two imaginary transverse surfaces containing the two longitudinal ends (3.A) can be defined parallel to an imaginary joining line (A) between a center of masses (CM) of said central wall (3.1) and the center of gravity (G) of the electric motor (M).

According to this, the longitudinal ends (3.A) of two of the central walls (3.1) of the corresponding damping element (3) are defined, in twos or in pairs, to form the angle with respect to the first part (1'), and preferably also with respect to the second part (2'), such that the corresponding imaginary transverse surfaces containing the two pairs of the longitudinal ends (3.A) can be defined parallel to the imaginary joining line (A) between the center of masses (CM) of the central walls (3.1) and the center of gravity (G) of the electric motor (M).

Each of the damping elements (3) is preferably configured such that an imaginary longitudinal line can be defined parallel to the imaginary central axis (X), the first imaginary central axis, and/or the second imaginary central axis, in addition to through the corresponding central wall (3.1) from one of the two elongated sides (3.B) to the other one of the two elongated sides (3.B). The damping elements (3) thereby assure resistance against tractive or compression forces parallel to the imaginary central axis (X), the first imaginary central axis, and/or the second imaginary central axis.

The invention claimed is:

1. A damping means for an electric motor (M) for an airflow generating apparatus with a longitudinal measurement according to an imaginary rotational central axis (X), comprising:
    a first part axially fixed to the electric motor (M);
    a second part axially fixed to the airflow generating apparatus, the first part and the second part separated from one another and aligned in axial direction with at least one damping element which is elastically deformable and has a longitudinal extension arranged between the first part and the second part;
    wherein the at least one damping element comprises at least one central wall, such that according to the longitudinal extension the central wall has two longitudinal ends and two elongated sides, with a first wall attached to the central wall along to one of the two elongated sides and fixed to the first part, and a second wall attached to the central wall along to the other of the two elongated sides and fixed to the second part, and
    wherein a surface of at least one of the two longitudinal ends of the at least one central wall is parallel to an imaginary joining line (A) between a center of masses (CM) of the at least one central wall and a center of gravity (G) of the electric motor (M).

2. The damping means according to claim 1, wherein there are at least one damping element comprises at least two damping elements, the damping elements being angularly distributed with respect to the imaginary central axis (X).

3. The damping means according to claim 1, wherein the at least one central wall comprises two central walls arranged in a parallel or converging manner with respect to one another.

4. The damping means according to claim 1, wherein the at least one central wall has an elongated laminar configuration.

5. The damping means according to claim 1, wherein the at least one damping element is configured such that an imaginary longitudinal line is defined parallel to the imaginary rotational central axis (X) and through the at least one central wall from one of the two elongated sides to the other one of the two elongated sides.

6. An airflow generating apparatus comprising the damping means according to claim 1.

7. The airflow generating apparatus according to claim 6, further comprising an electric motor (M), which in turn comprises a stator and a rotor for generating a rotational movement, and at least one blade arranged for suctioning and driving air.

* * * * *